United States Patent [19]

Kobayashi et al.

[11] Patent Number: 5,279,653
[45] Date of Patent: Jan. 18, 1994

[54] ALCOHOLIC MARKING PEN INK COMPOSITION

[75] Inventors: Kiyohiko Kobayashi; Humika Satou, both of Fujioka, Japan

[73] Assignee: Mitsubishi Pencil Kabushiki Kaisha, Tokyo, Japan

[21] Appl. No.: 910,232

[22] Filed: Jul. 9, 1992

[30] Foreign Application Priority Data

Jul. 12, 1991 [JP] Japan ................... 3-197489

[51] Int. Cl.$^5$ .................................... C09D 11/00
[52] U.S. Cl. .................. 106/20 R; 106/19 R; 106/22 R
[58] Field of Search .............. 106/19, 20, 22, 30, 106/19 R, 20 R, 22 R, 30 R

[56] References Cited

U.S. PATENT DOCUMENTS

| | | | |
|---|---|---|---|
| 3,961,965 | 6/1976 | Zwahlen | 106/22 |
| 4,304,601 | 12/1981 | Sharp | 106/30 |
| 4,525,216 | 6/1985 | Nakanishi | 106/30 |
| 4,557,618 | 12/1985 | Iwata et al. | 106/20 |
| 4,578,117 | 3/1986 | Nakanishi | 106/28 |
| 4,604,139 | 8/1986 | Shioi et al. | 106/22 |
| 4,605,441 | 8/1986 | Masuda et al. | 106/30 |
| 4,623,392 | 11/1986 | Ou-Yang | 106/30 |
| 4,666,519 | 5/1987 | Akiyama et al. | 106/20 |
| 4,822,417 | 4/1989 | Kobayashi et al. | 106/30 |

FOREIGN PATENT DOCUMENTS

| | | |
|---|---|---|
| 041369 | 3/1984 | Japan . |
| 63-317572 | 12/1988 | Japan . |
| 2-53470 | 11/1990 | Japan . |
| 3-250073 | 11/1991 | Japan . |

*Primary Examiner*—Helene Klemanski
*Attorney, Agent, or Firm*—Darby & Darby

[57] ABSTRACT

When something is written on the nonabsorbent surface of an iron plate, a glass plate or the like with a conventional marking pen ink using ethanol, the fixing power of the handwriting is weak, whitening phenomenon occurs owing to hygroscopicity, and ink scratch takes place as a result of the clogging of a penpoint. The present invention provides an alcoholic marking pen ink composition not having such drawbacks.

The ink composition of the present invention is characterized by comprising a colorant, ethanol, an ethanol-soluble phenolic resin having a softening point of 60° to 100° C. or its derivative, and an ethanol-soluble ketone resin having a softening point of 60° to 100° C.

4 Claims, No Drawings

ALCOHOLIC MARKING PEN INK COMPOSITION

BACKGROUND OF THE INVENTION (i) Field of the Invention

The present invention relates to an ink composition for use in an alcoholic marking pen. More specifically, it relates to an alcoholic marking pen ink composition which is excellent in fixing properties and whitening resistance of writings on the nonabsorbent surface of a glass, a metal, a resin or the like.

(ii) Description of the Related Art

In inks for oil marking pens, aromatic hydrocarbon solvents such as xylene and ketone solvents have been heretofore used which have good solubility in an oil-soluble dye, but these solvents have problems of safety to people such as odor and toxicity. For this reason, it is necessary on occasion that restrictions and limitations are put on the usage and use circumstances thereof.

In order to solve these problems, alcoholic inks mainly comprising alcohol solvents which are less odorous and less toxic, particularly ethanol inks containing ethanol as the main solvent have been developed in recent years. However, these alcoholic inks have the following drawbacks:

(1) When something is written on a nonabsorbent surface, the fixing power of the handwriting is weak. Therefore, when lightly rubbed, the handwriting is easily erased.

(2) Since ethanol has hygroscopicity, the handwriting absorbs moisture immediately after the writing on the nonabsorbent surface, and a whitening phenomenon occurs.

(3) The ink present at a penpoint or in an ink fountain absorbs moisture, and a water-insoluble resin component precipitates and leads to clogging and ink scratch. As a result, the writing becomes impossible. With the intention of solving this problem, an invention has been disclosed in Japanese Patent Publication No. Hei-2-53470/1990. However, the addition of solvents mentioned in this publication is not satisfactory in points of quick-drying properties and toxicity.

SUMMARY OF THE INVENTION

The present invention intends to solve the abovementioned drawbacks of an alcoholic ink composition, and an object of the present invention is to provide an alcoholic marking pen ink having low toxicity by which clear lines can be drawn without any whitening phenomenon by hygroscopicity and without any ink scratch by the clogging of a penpoint. When something is written on a nonabsorbent surface with the ink of the present invention, the handwriting is not easily erased even by rubbing it and an original writing state can be maintained.

The present inventors have intensively conducted various researches to achieve the above-mentioned object, and as a result, it has been found that when an alcohol-soluble resin having a specific softening point is used as an additive resin for an ink composition, an alcoholic marking pen ink composition having low toxicity can be obtained which brings about neither an ink scratch nor a whitening phenomenon and which can obtain a fixed writing state, and the present invention has been completed on the basis of the above-mentioned knowledge.

That is, the alcoholic marking pen ink composition of the present invention is characterized by comprising a colorant, ethanol, an ethanol-soluble phenolic resin having a softening point of 60° to 100° C. or its derivative, and an ethanol-soluble ketone resin having a softening point of 60° to 100° C.

DETAILED DESCRIPTION OF PREFERRED EMBODIMENTS

As a colorant which can be used in a composition of the present invention, various colorants can be used such as ethanol-soluble acid dyes, basic dyes and pigments. Examples of the dye include Oil Red 5B (Orient Chemicals Co., Ltd.), Barifast Black #3810 and #3820 (the same company), Spiro Red C-GH (Hodogaya Chemical Co., Ltd.), Rhodamines and Methyl Violets. Furthermore, examples of the pigment include inorganic pigments and organic pigments, and typical examples include carbon black, titanium oxide, iron black, red iron oxide, azocompounds, phthalocyanines, anthraquinone, indigo, triphenylmethane and xanthane.

These colorants may be used singly or in the form of a mixture of two or more thereof. No particular restriction is put on the amount of the colorant, and it can be used usually in a wide range of 0.03 to 40% by weight based on the total weight of the ink composition. Preferably, the amount of the colorants are in the range of 5 to 20%.

No particular restriction is put on a kind of ethanol which can be used in the composition of the present invention, but it preferably has a purity of 99% or more and is unmodified. This ethanol is the main component of the solvent in the ink composition, and it is used in an amount of 50 to 98%, preferably 64 to 90% by weight based on the total weight of the ink composition. A solvent other than ethanol may be added as a co-solvent such as a dye, but the amount of ethanol is 90% or more, preferably 95% or more of the total solvent.

Typical examples of an ethanol-soluble phenolic resin having a softening point of 60° to 100° C. or its derivative which can be used in the composition of the present invention include Hitanol 2501 (softening point 75° to 90° C.) made by Hitachi Chemical Co., Ltd. and Tamanol PA (softening point 90° to 100° C.) made by Arakawa Chemical Co., Ltd.

Furthermore, typical examples of an ethanol-soluble ketone resin having a softening point of 60° to 100° C. include Ketone Resin K90 (softening point 85° to 100° C.) by Arakawa Chemical Co., Ltd.

These resins can improve the fixing properties and the whitening resistance of writings on a nonabsorbent surface. No particular restriction is put on the amounts of these resins to be added, so long as they can supply the required fixing power and whitening resistance. The amounts of the resins are in the range of 2 to 20%, preferably 5 to 16% by weight of the total weight of the ink composition with each preferably 1 to 10% by weight on the same basis in view of the viscosity of the ink.

When the resins having a softening point of less than 60° C. are used, the handwriting remains tacky for a long period of time, and when the resins having a softening point of more than 100° C. are used, the fixing properties of the ink are poor on the nonabsorbent surface. In consequence, such resins are not desirable as resins which can be added to the composition of the present invention.

In addition, another resin, a plasticizer and the like may be added to the composition, so long as they do not impair the object of the present invention.

The ethanol-soluble phenolic rein having a softening point of 60° to 100° C. or its derivative and the ethanol-soluble ketone resin having a softening point of 60° to 100° C. which can be used in the composition of the present invention can improve the fixing properties and the whitening resistance of the writings on the nonabsorbent surface. This reason is not definite, but it can be presumed that both the resins in the ink composition have softening points as low as 60° to 100° C. and therefore there can be reduced internal stress at the volume shrinkage of the ink which occurs when these resins evaporate to dryness. In addition, the following function can also be supposed: These resins are compatible with water to some extent, and thus even if some water gets into the ink, the resins are not separated. This is the reason why problems such as the whitening of the drawn lines and the writing impossibility by ink scratch do not take place.

In the present invention, ethanol is used as a less toxic solvent, and so the ink which is also relatively excellent in safety to people can be obtained.

Since the alcoholic marking pen ink composition of the present invention comprises a colorant, ethanol as the main solvent, an ethanol-soluble phenolic resin having a softening point of 60° to 100° C. or its derivative and an ethanol-soluble ketone resin having a softening point of 60° to 100° C. as additive resins, there can be solved the weak fixing properties to the nonabsorbent surface of an iron plate, a glass plate or the like and a whitening phenomenon by hygroscopicity which are problems of a conventional marking ink using an ethanol solvent. That is, when something is written on the nonabsorbent surface of the iron plate, the glass plate or the like, the handwriting is not easily erased even by rubbing it and an original writing state can be maintained without any whitening phenomenon by hygroscopicity. Moreover, clear lines can be also written without any ink scratch by the clogging of a penpoint. In addition, the ink composition of the present invention can be used safely, since it is less toxic.

EXAMPLES

An ink composition of the present invention will be described in reference to examples and comparative examples. In the examples and the comparative examples, "parts" means parts by weight, and evaluation tests were carried out by the following procedures:

Fixing properties: Lines were drawn on the nonabsorbent surface of a glass or the like, and after they were allowed to stand for 16 hours, the drawn lines were rubbed with an applicator. The fixing properties were evaluated by the number of the rub operation until the drawn lines were completely erased.

Whitening properties: Lines were drawn on the surface of a glass plate under conditions of 25° C. and 65% RH (abbreviation of relative humidity), and the state of the drawn lines was observed.

In the respective tests, the evaluation was made in accordance the following ranking:
- ⊙ ... particularly good,
- ○ ... good,
- Δ ... slightly bad, and
- × ... bad.

EXAMPLE 1

The following materials were sufficiently stirred and mixed to obtain an alcoholic marking pen (blue) ink composition. The results of its evaluation are set forth in Table 1.

| | |
|---|---|
| Blue dye (Barifast Blue #2606 made by Orient Chemicals Co., Ltd.) | 10 parts |
| Phenolic resin (softening point 75-90° C.) (Hitanol 2501 made by Hitachi Chemical Co., Ltd.) | 8 parts |
| Ketone resin (softening point 85-100° C.) (Ketone Resin K-90 made by Arakawa Chemical Co., Ltd.) | 7 parts |
| Ethanol | 75 parts |

EXAMPLE 2

The following materials were used in the same manner as in Example 1 to obtain a marking pen (black) ink composition. The results of its evaluation are set forth in Table 1.

| | |
|---|---|
| Black pigment (Carbon Black MA-8 made by Mitsubishi Chemical Industries, Ltd.) | 10 parts |
| Phenolic resin (softening point 90-100° C.) (Tamanol PA made by Arakawa Chemical Co., Ltd.) | 7 parts |
| Ketone resin (softening point 85-100° C.) (Ketone Resin K-90 made by Arakawa Chemical Co., Ltd.) | 8 parts |
| Ethanol | 65 parts |
| Isopropyl alcohol | 10 parts |

COMPARATIVE EXAMPLE 1

The following materials were used in the same manner as in Example 1 to obtain a marking pen (violet) ink composition. The results of its evaluation are set forth in Table 1.

| | |
|---|---|
| Violet dye (Methyl Violet made by Hodogaya Chemical Co., Ltd. | 5 parts |
| Phenolic resin (softening point 80-88° C.) (Tamanol 531 made by Arakawa Chemical Co., Ltd.) | 10 parts |
| Ketone resin (softening point 110-130° C.) (Hi-Lack 110H made by Hitachi Chemical Co., Ltd.) | 5 parts |
| Ethanol | 80 parts |

COMPARATIVE EXAMPLE 2

The same procedure as in Example 1 was effected except that a phenolic resin in Example 1 was replaced with another phenolic resin (softening point 110°-130° C.) (Tamanol 100S made by Arakawa Chemical Co., Ltd.) and a ketone resin was replaced with another ketone resin (softening point 110°-130° C.)(Hi-Lack 110H made by Hitachi Chemical Co., Ltd.), thereby obtaining a marking pen (blue) ink composition. The results of its evaluation are set forth in Table 1.

TABLE 1

| | Evaluation Test | | | |
|---|---|---|---|---|
| Test Surface | Example 1 | Example 2 | Comparative Example 1 | Comparative Example 2 |
| Fixing Properties | | | | |
| Glass | ⊙ | ⊙ | ○ | ○ |
| Metal*1 | ⊙ | ⊙ | ○ | Δ |
| Resin Plate*2 | ○ | ○ | Δ | × |
| Whitening Resistance | | | | |

TABLE 1-continued

| Test Surface | Evaluation Test | | | |
|---|---|---|---|---|
| | Example 1 | Example 2 | Comparative Example 1 | Comparative Example 2 |
| Glass | ○ | ○ | Δ | x |

Metal*1: Brass
Resin Plate*2: Polypropylene resin.

What is claimed is:

1. An alcoholic marking pen ink composition comprising a color effective amount of a colorant, a solvent effective amount of ethanol, and from 2 to 20 weight percent of a combination of an ethanol-soluble phenolic resin having a softening point of 60° to 100° C. or its derivative and an ethanol-soluble ketone resin having a softening point of 60° to 100° C., based upon the total weight of the ink composition.

2. The alcoholic marking pen ink composition according to claim 1 which comprises 0.03 to 40% of the colorant, 50 to 98% of ethanol, and 2 to 20% of the phenolic resin and ketone resin combined by weight respectively based on the total weight of the ink composition.

3. The alcoholic marking pen ink composition according to claim 2 wherein said combined resin comprises 1 to 10% of the ethanol-soluble phenolic resin or its derivative and 1 to 10% of the ethanol-soluble ketone resin by weight based on the total weight of the ink 4. An alcoholic marking pen ink composition which comprises 0.03 to 40% of colorant, 50 to 98% of a solvent, said solvent comprising at least 90% ethanol base on the total weight of solvent an ethanol-soluble phenolic resin having a softening point of 60° to 100° C. or its derivative, and 1 to 10% of an ethanol-soluble ketone resin having a softening point of 60° to 100° C., by weight respectively based on the total weight of the ink composition.

* * * * *